United States Patent
Katz et al.

(10) Patent No.: US 8,234,039 B2
(45) Date of Patent: Jul. 31, 2012

(54) CONSERVED ENERGY METRICS FOR FRONTAL IMPACT SENSING ALGORITHM ENHANCEMENT IN MOTOR VEHICLES

(75) Inventors: Beverly M. Katz, Livonia, MI (US); Wei-Te Chiang, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1020 days.

(21) Appl. No.: 12/166,569

(22) Filed: Jul. 2, 2008

(65) Prior Publication Data
US 2010/0004819 A1  Jan. 7, 2010

(51) Int. Cl.
*G06F 17/00* (2006.01)
*B60R 22/00* (2006.01)

(52) U.S. Cl. .......................................... 701/36; 701/45
(58) Field of Classification Search .................. None
See application file for complete search history.

(56) References Cited

U.S. PATENT DOCUMENTS

| | | | |
|---|---|---|---|
| 5,282,134 A * | 1/1994 | Gioutsos et al. ................. 701/45 |
| 5,587,906 A | 12/1996 | McIver et al. |
| 5,758,301 A * | 5/1998 | Saito et al. ....................... 701/45 |
| 5,935,182 A | 8/1999 | Foo et al. |
| 6,036,225 A | 3/2000 | Foo et al. |
| 6,186,539 B1 | 2/2001 | Foo et al. |
| 6,453,224 B1 * | 9/2002 | Caruso et al. .................... 701/45 |
| 6,459,366 B1 * | 10/2002 | Foo et al. ........................ 340/436 |
| 6,681,199 B2 * | 1/2004 | Imai et al. ........................ 702/189 |
| 6,714,848 B2 * | 3/2004 | Schubert et al. ................. 701/46 |
| 7,075,290 B2 * | 7/2006 | Collier-Hallman et al. .. 324/163 |
| 2002/0013648 A1 * | 1/2002 | Feser et al. ....................... 701/45 |
| 2002/0152054 A1 * | 10/2002 | Imai et al. ..................... 702/189 |
| 2009/0225489 A1 * | 9/2009 | Lehner et al. ................. 361/152 |

* cited by examiner

*Primary Examiner* — Thomas Tarcza
*Assistant Examiner* — Nagi Murshed
(74) *Attorney, Agent, or Firm* — Ralph E. Smith

(57) ABSTRACT

A motor vehicle is provided that has a deployable occupant protection device, a controller that manages deployment activity, and a sensor located in a forward portion of the vehicle that produces a forward crash signal in response to crash stimulus. The forward crash signal varies between positive and negative values over time. At least some of the negative values are converted to positive values, defining a conditioned crash signal which is processed with an integrating algorithm, defining a conserved energy crash metric value that supplements processing of a central crash signal while evaluating a potential crash event(s). The conserved energy crash metric value can be used as a confirmatory factor, influencing whether to deploy the deployable occupant protection device. Or, for deployable occupant protection devices having multiple deployment stages, the conserved energy crash metric value can be used in determining whether to initiate one or more of the deployment stages.

22 Claims, 5 Drawing Sheets

CONSERVED ENERGY METRICS FOR FRONTAL IMPACT SENSING ALGORITHM ENHANCEMENT IN MOTOR VEHICLES

FIELD

The present invention relates to motor vehicles that use impact sensing algorithms for controlling occupant protection devices, and more particularly to motor vehicles that use crash sensor signal manipulations in concert with impact sensing algorithms so that the resultant crash metrics are highly indicative of crash occurrence and severity.

BACKGROUND

Occupant restraint systems that include deployable occupant protection devices, such as air bags, for motor vehicles are well known in the art. Typically, these systems include one or more sensors that detect crash stimulus, for example, vehicle deceleration which is commonly referred to as crash acceleration, and an airbag that deploys when a controller energizes an igniter of the airbag. For example, when the igniter is energized, it releases or initiates a flow of inflation fluid from a reservoir or other storage device into the air bag, inflating it.

In some known occupant restraint systems, the deployable occupant protection device inflates in multiple stages. This allows the device to partially inflate or deploy in crash instances that are relatively less severe or fully inflate or deploy in crash instances that are relatively more severe. Typically, multiple inflation fluid reservoirs or other storage devices and multiple sensors are used in such systems.

The controller in such systems is configured to differentiate between low level deployment events, mid level deployment events, and high level deployment events, using any of a variety of known algorithms. These known algorithms typically use integration functions for signal processing and evaluating the resultant values versus predetermined criteria in determining crash occurrence or severity. Examples of such known algorithms are illustrated in, for example, U.S. Pat. No. 5,587,906; U.S. Pat. No. 5,935,182; U.S. Pat. No. 6,036,225; and U.S. Pat. No. 6,186,539.

U.S. Pat. No. 5,587,906 discloses an air bag restraint system where a crash acceleration value is integrated to provide a crash velocity value and to partially determine a crash metric value. The crash metric value is compared to threshold values to determine whether to deploy the air bag.

U.S. Pat. No. 5,935,182 discloses an air bag restraint system where a crash acceleration value is determined as a function of crash velocity and crash displacement using integrating functions. The crash acceleration value is then processed using an occupant spring-mass model for adjusting the crash acceleration signal. Air bag deployment decisions are made based on the adjusted crash acceleration signal.

U.S. Pat. No. 6,036,225 discloses an air bag restraint system that can be deployed in multiple stages. A signal indicative of acceleration is integrated to provide a velocity signal which is processed to determine a velocity value. When the velocity value exceeds a first threshold value, a first deployment stage is initiated. When the velocity value exceeds a second threshold value, a second deployment stage or complete deployment is initiated.

U.S. Pat. No. 6,186,539 discloses an air bag restraint system that can also be deployed in multiple stages. An average crash acceleration value is determined by processing signals from multiple crash sensors, and is compared against a crash severity index. When the average crash acceleration value exceeds a first threshold value, a first deployment stage is initiated. When the average crash acceleration value exceeds a second threshold value, a second deployment stage or complete deployment is initiated.

Such efforts have proven beneficial and successfully increase occupant safety during crash events. Although these systems are successful and sufficient, further technological developments could prove desirable. For example, during offset deformable barrier (ODB) crash tests, and analogous actual impact or crash events, considerable signal fluctuation occurs due to energy absorption and yielding and corresponding positive and negative acceleration signals during early stages of impact, whereby innovative signal processing might prove desirable.

Accordingly, it could prove desirable to provide a vehicle that incorporates a deployable occupant protection device that is controlled by processing which can accurately account for high magnitude and high frequency signal content, varying between positive and negative values.

It could also prove desirable to provide a vehicle that incorporates a deployable occupant protection device that uses a supplemental algorithm to enhance performance of a known crash algorithm.

It could also prove desirable to provide a supplemental algorithm that preliminarily processes crash signals transmitted by crush zone crash sensors, so that resultant values are easily accommodated by a known crash algorithm.

It could also prove desirable to provide a supplemental algorithm that improves accuracy of deployment decisions during angular, oblique, or offset front end collision events.

It could also prove desirable to provide a supplemental algorithm that leads to quicker deployment initiation decisions during angular, oblique, or offset front end collision events.

SUMMARY

The present invention is directed to one or more improvements of motor vehicle crash sensing systems, crash severity determining systems, and corresponding controls for deployable occupant protection devices. A motor vehicle crash sensing system of the present invention processes a crash signal from a sensor, converting any periodic negative values within a varying signal to positive values, defining a conditioned crash signal. The crash signal is converted to the conditioned crash signal by way of, for example, processing the crash signal with an absolute value function, a squaring function, or other manipulation or operations which suitably convert negative values to positive values.

The conditioned crash signal is processed by way of a crash determining algorithm, an integrating or other algorithm, to define a conserved crash energy metric. An occupant protection system controller evaluates the conserved energy metric while making deployment decisions, for example, whether to initiate deployment of the deployable occupant protection devices and/or if so, to what extent the deployment should occur.

Accordingly, an object of the invention is to provide conserved energy metric values that are calculated in a manner that produces only positive values, supplementing known crash metric values used for determining crash occurrences and severity.

Another object of the invention is to utilize a conserved energy metric value as a confirmatory factor for determining whether to deploy a deployable occupant protection device.

A further object of the invention is to utilize a conserved energy metric value to mitigate effects of positive and negative value fluctuations of acceleration signals, such as is frequently encountered during early stages of impact, on signal processing by an occupant protection system controller.

Yet another object of the invention is to consider a conserved energy metric value in determining whether to initiate a single stage of a multiple stage deployable occupant protection device.

Still another object of the invention is to consider conserved energy metric values and accumulated velocity or displacement values while making occupant protection device deployment decisions.

Other features and advantages of the invention will become apparent to those skilled in the art from the following detailed description and accompanying drawings. It should be understood, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

Figure 1:
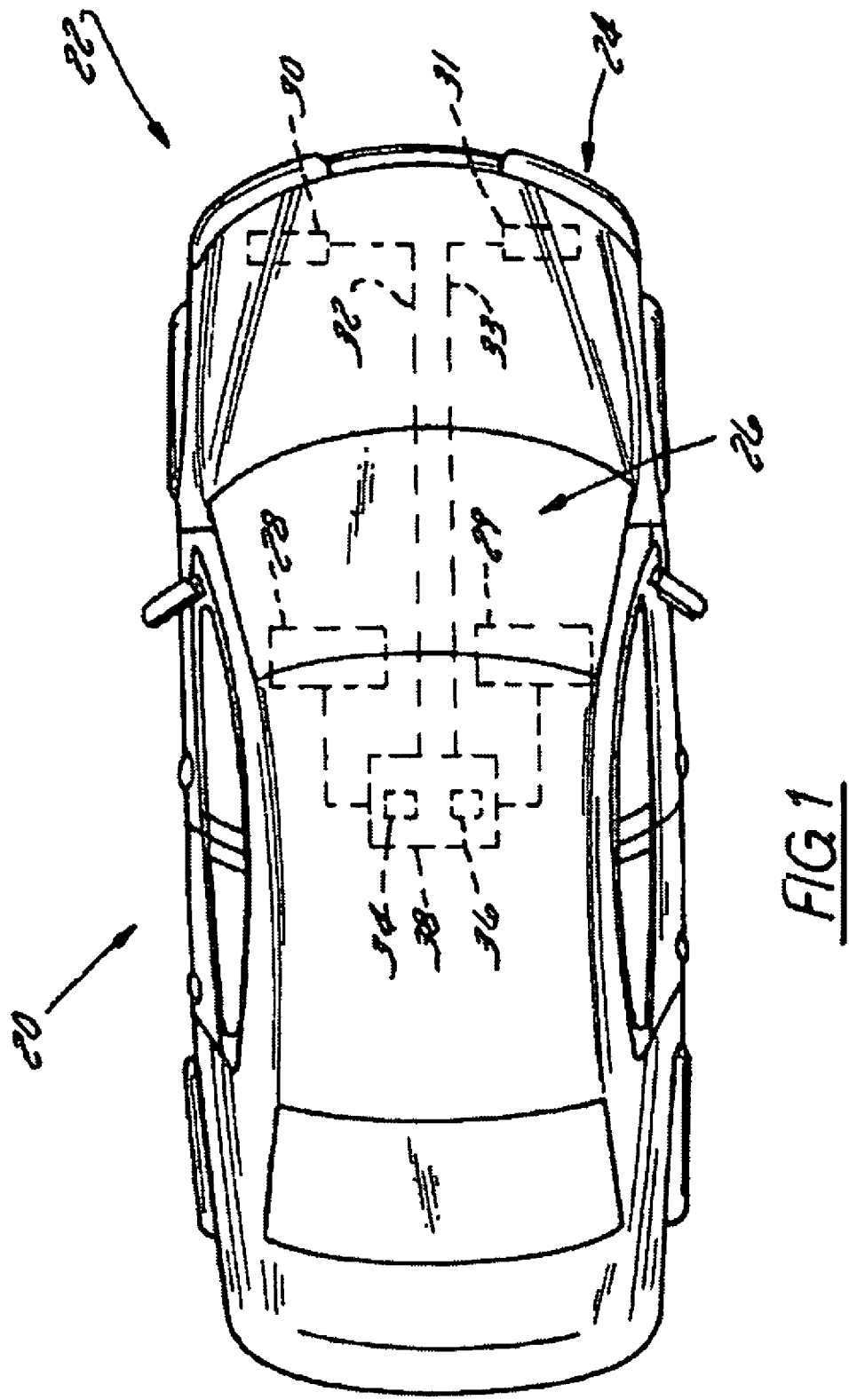
FIG. 1 is a top plan view of a motor vehicle equipped with a deployable occupant protection device that is controlled at least in part based on conserved energy metric values in accordance with the present invention.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIG. 1 illustrates a motor vehicle 20 in accordance with the present invention and generally defines crush zones 22, 24 at forward, lateral portions of the motor vehicle 20. The crush zones 22, 24 are configured to suitably yield and thus absorb energy during front end collisions, particularly angular, oblique, or offset front end collisions. Motor vehicle 20 is equipped with an occupant protection system 26 shown in phantom in FIG. 1. Occupant protection system 26 includes deployable occupant protection devices 28, 29, one or more crush zone sensors 30, 31, and a control module, e.g., occupant protection system controller 38, that uses crash signals from the sensors 30, 31 in initiating and controlling deployment of the occupant protection devices 28, 29. Controller 38 typically includes a processor, such as a microcontroller or the like, along with suitable discrete digital and/or analog circuitry assembled on one or more circuit boards, optionally as an application specific integrated circuit.

Deployable occupant protection devices 28, 29 are intended to encompass one or more airbags such as, for example, airbags that inflate in a single stage, airbags that inflate in multiple stages, airbag systems which employ multiple airbags such as a driver side airbag along with one or more of a passenger side airbag, a side curtain airbag, or other suitable airbag systems. The deployable occupant protection devices 28, 29 are configured to deploy or inflate when the controller 38 of the occupant protection system 26 makes a determination that a crash event warranting deployment is occurring, such as detected using one or more sensors 30, 31.

Still referring to FIG. 1, crush zone sensors 30, 31 can be any of a variety of suitable sensors, e.g., MEMS accelerometers, pressure sensors, or other crush zone sensors, noting that accelerometers are used for typical implementations. For example, known accelerometers having suitable nominal sensitivity values will suffice for use as crush zone sensors 30, 31. The crush zone sensors 30, 31 are typically mounted in forward, lateral portions of motor vehicle 20, such as crush zones 22, 24, respectively. Optionally, crush zone sensors 30, 31 can be mounted in other portions of motor vehicle 20 that tend to absorb energy during angular front end collisions, or otherwise permit sensors 30, 31 to detect crash forces or stimulus indicative of straight or flat front end collisions, angular front end collisions, or offset front end collisions. Upon detecting such crash stimulus, crush zone sensors 30, 31 communicate crash signals along lines, 32, 33, e.g., digital bus lines, to the controller 38.

Referring still to FIG. 1, for example, if crush zone sensors 30, 31 are accelerometers and vehicle 20 undergoes an angular or offset front end collision, then the resultant acceleration signals, e.g., forward crash or acceleration signals, can and frequently do exhibit considerable signal fluctuation. This can be due to variations in the rate of energy absorption by crush zones 22, 24 of the vehicle 20 during the crash, angular displacement of the crush zone sensors 30, 31 caused during the crash that displaces them off-axis relative to the direction of the transmitted crash force, as well as other factors. As a result, the forward crash signal can and often does vary between positive and negative values over time with at least some of the positive and negative values being rather large in magnitude.

Regardless of the particular characteristics of the crush zone sensor signals, e.g., forward crash signals, transmitted via bus lines 32, 33, they are filtered using hardware and/or software filters to eliminate, for example, high frequency and/or other noise. Such filtering can be suitably performed at or near controller 38, but is typically performed upstream of the controller 38, for example, onboard the crush zone sensor 30, 31. It is also preferred that the crush zone sensors 30, 31 include analog to digital converters, allowing the signal to be transmitted through bus lines 32, 33, to controller 38, digitally. Bus lines 32, 33 represent cabling or other suitable conductors of a digital bus, such as a CAN bus or the like, which links crush zone sensors 30, 31 with controller 38.

Other sensors, namely central vehicle sensors 34, 36 are positioned substantially at or near a central portion of the vehicle 20, such as adjacent a driver of the vehicle 20. Although the controller 38 is shown in FIG. 1 disposed in a central vehicle location with sensors 34, 36 onboard the controller 38, the controller 38 can be situated in a location different from the sensors 34, 36 if desired. Where located onboard the controller 38, the central vehicle sensors 34, 36 can be integrated into controller circuitry.

As with crush zone sensors 30, 31, central vehicle sensors 34, 36 can be any of a variety of suitable sensors, typically accelerometers, e.g., MEMS accelerometers or other suitable sensors. Known accelerometers having suitable nominal sensitivity values will suffice for use as central vehicle sensors 34, 36. In at least one embodiment where sensors 34, 36 are accelerometers, the sensors 34, 36 are set up so they are out of phase with one another. The signals, e.g., central crash or acceleration signals, are filtered either on the sensors 34, 36 themselves or elsewhere, and converted from analog to digital format before being transmitted to and received by controller 38 for further processing.

Figure 2:
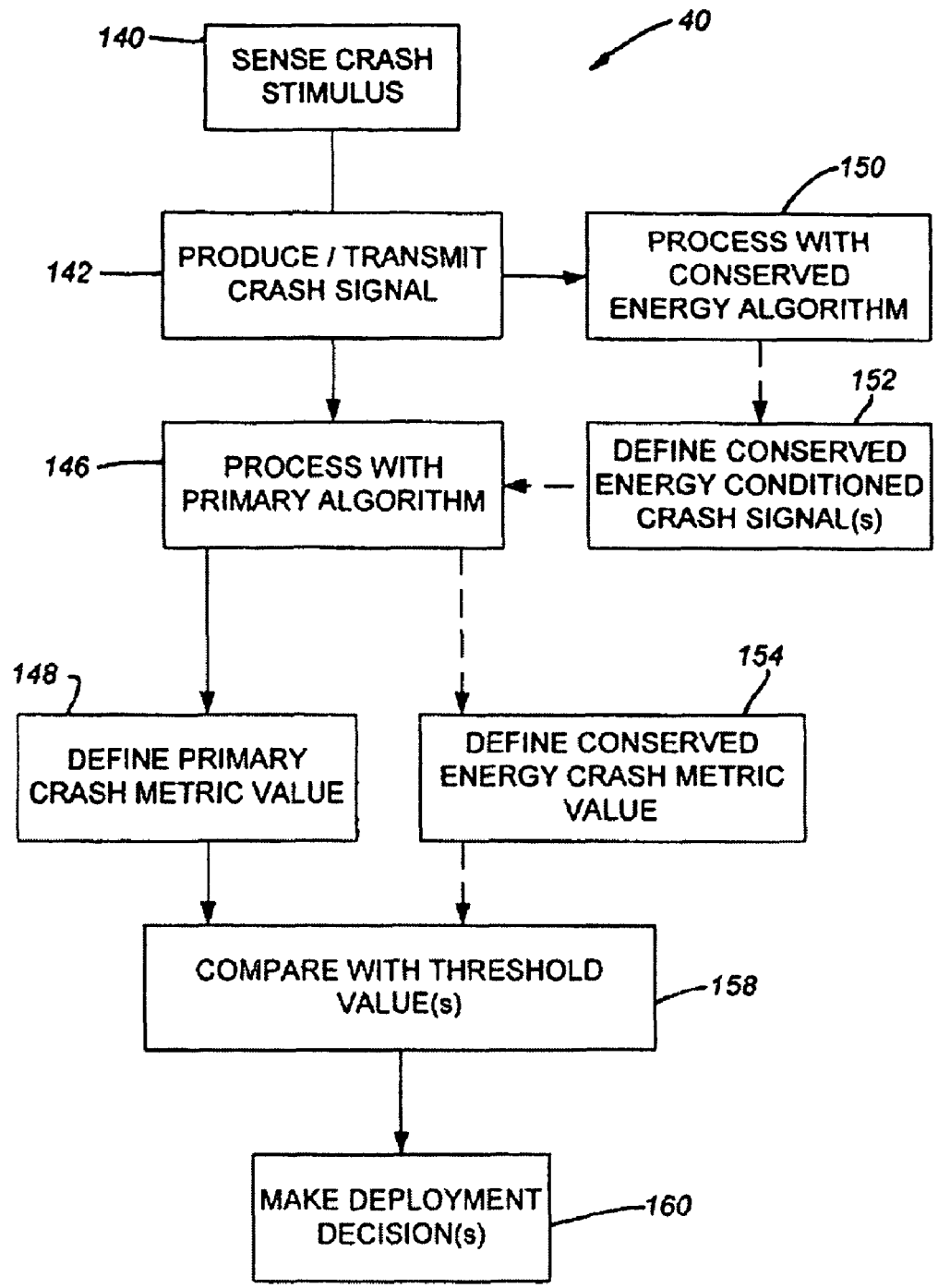
FIG. 2 is a flowchart of a first algorithm for use in accordance with the present invention to control a deployable occupant protection device based at least in part on conserved energy metric values.
Figure 3A:
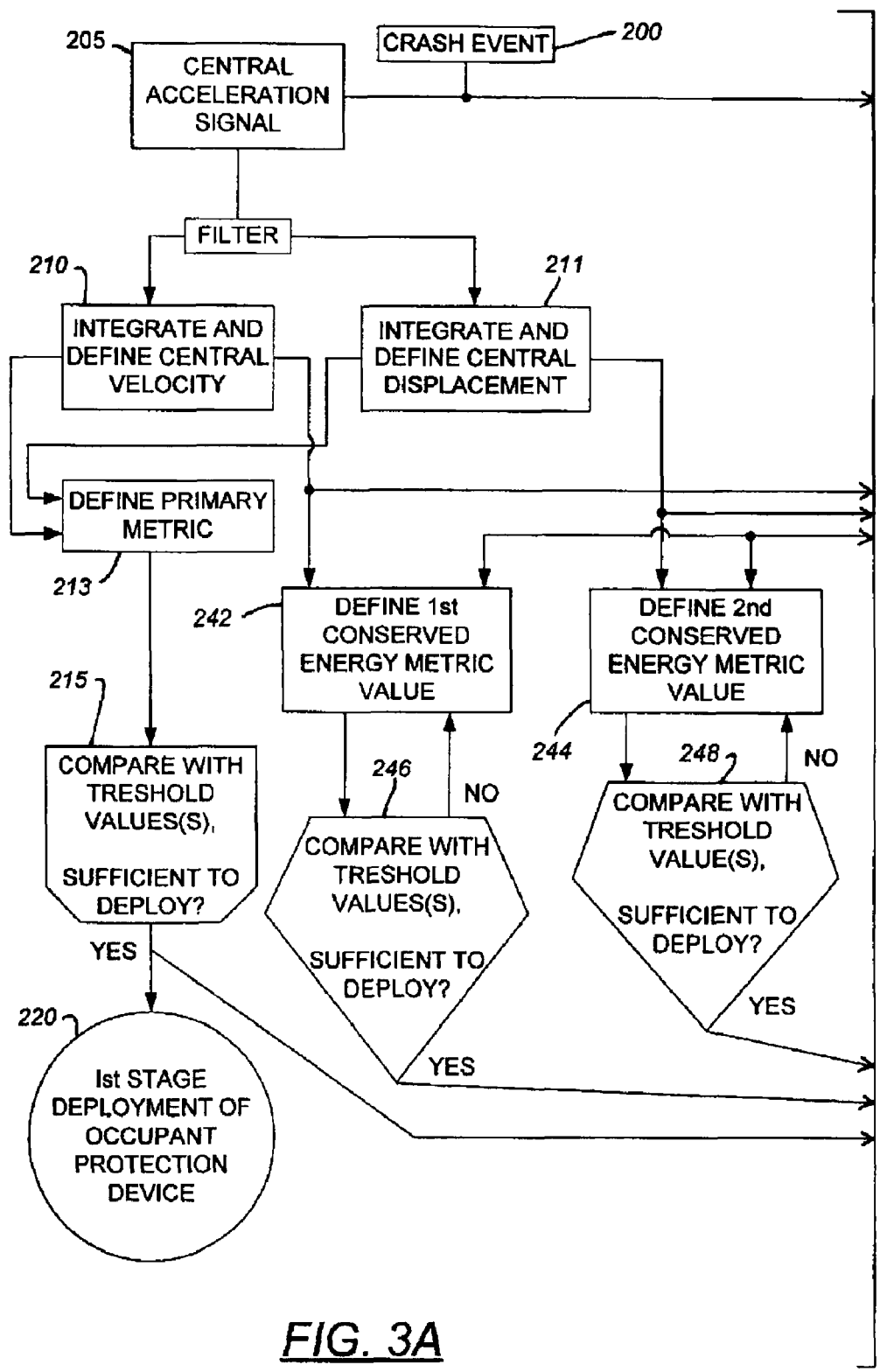
FIG. 3A is a left-side portion of a flowchart of a second algorithm for use in accordance with the present invention to control a deployable occupant protection device based at least in part on conserved energy metric values.
Figure 3B:
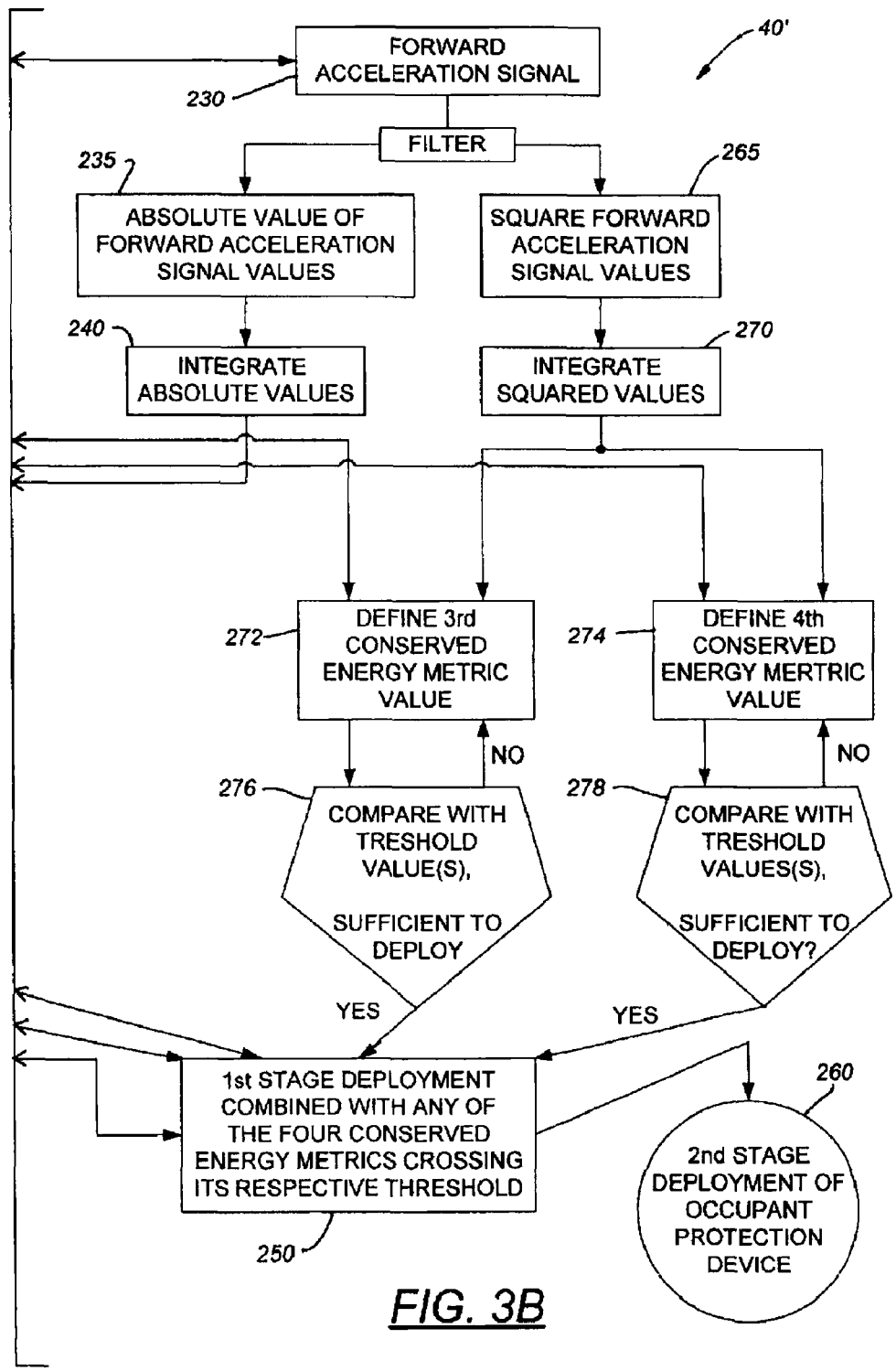
FIG. 3B is a right-side portion of the flowchart of FIG. 3A.

Referring generally to FIGS. 1, 2, and 3, the controller 38 monitors the filtered and digitized forward crash signals from crush zone sensors 30, 31 and also the central crash signals from central vehicle sensors 34, 36, and processes them to evaluate whether a crash is occurring and, if so, its severity level. Based on this, controller 38 is configured, e.g. programmed, to make a determination of whether to deploy occupant protection devices 28, 29. For multi-stage versions of occupant protection devices 28, 29 the controller 38 is further configured to evaluate the severity level in determining to what extent the occupant protection devices 28, 29 will be deployed. To make such determinations, controller 38 is configured to evaluate crash stimulus and corresponding data using, for example, an occupant protection system method 40 configured in accordance with the present invention, such as depicted in the schematic diagram shown in FIG. 2.

Referring now to FIGS. 1 and 2, by implementing occupant protection system method 40 into controller 38, such as by configuring it in firmware or software, when a crash event occurs, crash stimulus is detected 140 using the crush zone sensors 30, 31 and/or central vehicle sensors 34, 36, collectively referred to as sensors 30, 31, 34, 36. The sensors 30, 31, 34, 36 produce and transmit 142 respective crash signals, indicative of the crash event having, for example, amplitude and frequency values which correspond to crash characteristics. As previously mentioned, the forward and central crash signals are also filtered and digitized during this step 142, reducing the likelihood of noise compromising the integrity of the signal that is transmitted along bus lines 32, 33 to controller 38.

With specific reference to FIG. 2, these signals are processed with a primary algorithm 146 and a conserved energy algorithm 150, either in parallel, e.g. simultaneously, or sequentially as desired, depending on factors that include the particular end use configuration of occupant protection system 26. The algorithm used in the processing with a primary algorithm step 146 is pre-selected based on the configuration of vehicle 20 and is preferably a known or conventional crash algorithm. Those skilled in the art are well aware of such suitable known crash algorithms and how to implement the same into an occupant protection system 26.

Typical of known crash algorithms, the algorithm of the primary algorithm step 146 uses the crash signals from one or more of sensors 30, 31, 34, 36 in measuring or determining various values and/or characteristics of the crash event. The primary algorithm step 146 evaluates, determines, or obtains values relating to, for example, crash acceleration, crash energy, crash velocity, crash displacement, crash jerk, or other crash indicia. One suitable method includes integrating crash acceleration values to determine crash velocity values, optionally further processing the crash velocity values by integrating them to arrive at crash displacement values.

Regardless of whether the primary algorithm processes acceleration, velocity, or displacement values, the values are typically processed with a summing function so that accumulated values can be considered, often referred to as "crash metrics" or "crash metric values," represented by defining a primary crash metric value step 148. After the primary crash metric value is defined in step 148, it is evaluated, preferably in a known manner, against one or more predetermined threshold values 158. This threshold value comparison step 158 can be done comparing the crash metric value with known values contained in, e.g., various look-up tables, crash event indices, or crash severity indices. Based at least in part on such comparison step 158 using the primary crash metric value, the controller 38 executes a deployment decision step 160. In other words, for single stage deployable occupant protection devices 28, 29, the controller 38 uses the comparative results to decide 160 whether to energize the igniter that will deploy the occupant protection devices 28, 29 where such devices 28, 29 are airbags. For multi-stage airbag occupant protection devices 28, 29, the controller 38 uses the comparative results to decide 160 if and to what extent to deploy the occupant protection devices. Namely, during the deployment decision step 160, controller 38 determines whether to energize the igniter(s) that deploys airbag occupant protection devices 28, 29, and, if so, how many and to what extent.

With continued reference to FIG. 2, the crash signals 142 are also processed using the conserved energy algorithm 150. In typical implementations, the processing conserved energy algorithm processing step 150 only processes forward crash signals from the crush zone sensors 30, 31. This is because the forward crash signals transmitted by the crush zone sensors 30, 31 tend to exhibit considerable signal fluctuation, including alternating positive and negative acceleration indications, which can be accommodated by the conserved energy metric to enhance the overall performance of the occupant protection system 26.

During execution of the conserved energy algorithm step 150, controller 38 processes the forward crash signals from crush zone sensors 30, 31 in a manner that converts negative crash signal values to positive values in accordance with the present invention. The conserved energy algorithm may convert negative values of the forward crash signals to positive values using any of a variety of suitable processes, operations, or functions. For example, in one preferred conserved energy algorithm implementation, the negative values are converted to positive values using a squaring or other exponential operation. When using such an implementation, the exponential function preferably raises the negative input value to a power of an even exponent value, i.e., an exponent value that is a multiple of the integer "two," ensuring that the negative input values are converted into positive values. In another preferred implementation, negative crash signal values are converted into positive values by processing them with an absolute value function, again ensuring that the resulting values will be positive. Regardless of the particular technique for converting negative crash signal values into positive values, doing so alone or in combination with other mathematical processes defines a conditioned crash signal according to step 152.

After the conserved energy conditioned crash signal is defined in step 152, it is then processed with primary algorithm pursuant to step 146. Here again, the primary algorithm is preferably known or conventional, whereby it can be processed with a function that includes or otherwise employs one or more integration and/or summing functions to arrive at an accumulated value. The result of processing the conserved energy conditioned crash signals 152 using the primary algorithm in step 146 defines conserved energy crash metric value(s) in step 154.

Intuitively, the conserved energy crash metric value has a greater magnitude than the corresponding primary crash metric value, despite being processed with the same primary algorithm 146. Furthermore, when the primary algorithm includes summing operations, the conserved energy crash metric value accumulates or grows at a faster rate than the primary crash metric value. This is because positive and negative crash signal values transmitted in step 142 directly to the primary algorithm in step 146 for processing tend to at least partially offset or cancel one another. This contrasts with processing these same positive and negative crash signal values using the conserved energy algorithm in step 150 to define conserved energy conditioned signal(s) in step 152 before primary algorithm processing in step 146 because the negative values are converted into positive values thereby eliminating their ability to offset or cancel.

After the conserved energy crash metric value is defined in step 154, it is evaluated, preferably in a known manner, against one or more predetermined threshold values in step 158. In at least one implementation, the conserved energy crash metric value is compared to a threshold value(s) in step 158 using the same or a similar comparative procedures as used in carrying out the primary crash metric value comparison. For example, the threshold values can be predetermined and the calculated conserved energy crash metric values can be compared directly thereto. As another example, data tables can be implemented, e.g., various look-up tables, crash event indices, or crash severity indices, against which the conserved energy crash metric values can be compared. Based at least in part on such comparison with the conserved energy crash metric, the controller 38 executes a deployment decision step 160, e.g., determines whether to deploy one or more of the occupant protection devices 28, 29, and if so, to what extent. In one preferred implementation, threshold value comparisons made in step 158 using both the primary crash metric value defined in step 148 and the conserved energy crash metric value defined in step 154 are used in making one or more deployment decisions in step 160.

Referring now to FIGS. 1 and 3, in at least one implementation of an occupant protection system 26 configured in accordance with the present invention, the occupant protection system method 40' depicted in FIG. 3 is configured so that the conserved energy metric value can be used to initiate quicker initial deployments, quicker subsequent stage deployments, and/or initiate deployments that might not have otherwise occurred using only the primary crash metric value.

For example, when a crash event occurs 200, the central vehicle sensors 34, 36 transmit an acceleration signal 205, e.g., a central crash signal, to the controller 38. The signal can be filtered on the central vehicle sensors 34, 36 themselves, and/or at the controller 38, which integrates the signal to define a central velocity 210. In some implementations, the central velocity values are integrated a second time, defining central displacement values pursuant to step 211. Controller 38 uses a primary algorithm, which is preferably a known crash algorithm, to process either the central velocity 210 or central displacement 211 values to determine a primary crash metric value 213.

The controller 38 then compares the primary crash metric value 213 to a threshold value in determining whether a crash event worthy of deployment is occurring 215. If the threshold value for the first deployment stage of occupant protection device 28, 29 is met or exceeded, for example, a low threshold level, then controller 38 initiates the first deployment stage 220.

Still referring to FIGS. 1 and 3, the crush zone sensors 30, 31 produce a forward acceleration signal 230, e.g., a forward crash signal, preferably filter it, and transmit it to the controller 38. The controller 38 processes the forward acceleration signal 230 with at least one conserved energy algorithm, resulting in at least one conserved energy conditioned crash signal. For implementations that use multiple operations to arrive at multiple resultant values, the different operations can be performed in parallel, e.g., simultaneously, or in sequence, as desired. For example, the forward acceleration signal 230, preferably after it has been filtered, is processed using a conserved energy algorithm that converts negative values of the forward acceleration signal 230 into positive values. As one example, such negative value can be converted to positive values using an absolute value function 235. Then, an integration step 240 is performed on the absolute values of the acceleration signal.

Referring now specifically to FIG. 3, in processing steps that are parallel to the absolute value conversion and integration steps 235 and 240, the filtered forward acceleration signal 230 is processed using an exponential function, e.g., squared, by way of step 265 for converting negative values to positive values. Then the squared acceleration signal values 265 can be integrated during step 270.

Referring again to FIGS. 1 and 3, at this point, controller 38 utilizes various ones of the resultant values of (i) integrating absolute values of the forward acceleration signal 240, (ii) integrating squared values of the forward acceleration signal 270, (iii) central velocity 210, and (iv) central displacement 211, to define various conserved energy metric values. For example, again depending on the particular algorithm(s) used by occupant protection system 26, controller 38 can use central velocity 210 and forward acceleration integrated absolute values 240 to define a first conserved energy metric value 242. Central displacement 211 and forward acceleration integrated absolute values 240 can be considered in defining a second conserved energy metric value 244. Central velocity 210 and forward acceleration integrated squared values 270 can be considered in defining a third conserved energy metric value 272. Central displacement 211 and forward acceleration integrated squared values 270 can be considered in defining a fourth conserved energy metric value 274.

Referring again to FIGS. 1 and 3, each of the four conserved energy metrics 242, 244, 272, and 274 is compared to a predetermined threshold value for evaluation of crash occurrence and/or severity. Such comparisons can be done independently or along independent paths, pursuant to threshold comparison steps 246, 248, 276, and 278, respectively. If the threshold comparison steps 246, 248, 276, and 278 indicate that deployment or further deployment of occupant protection devices 28, 29 is not justified, then controller 38 returns or goes back to the previous step for reevaluation, for example, using the most recent data.

For example, when deployment is not justified pursuant to threshold comparison step 246, controller 38 reverts to step 242, defining a the most recent value of $1^{st}$ conserved energy metric 242 and then evaluates such conserved energy metric 242 against the respective threshold value 246. The same is true for the other respective pairs of the conserved energy metrics 244, 272, and 274 and threshold comparisons 248, 276, and 278. Stated another way, since the absolute and squared value processing 235, 265 is performed in parallel, the threshold comparisons 246, 248, 276, and 278 can be described as progressing along independent paths according to an "OR" type logic scheme or configuration.

Referring still to FIGS. 1 and 3 accordingly to step 250, in some instances or at some point during a crash event, a mid-level or high level threshold value of one of the threshold comparisons 246, 248, 276, and 278, can be met or exceeded, and a first stage, low level, or initial deployment of occupant protection devices 28, 29 has already occurred. Under these conditions, pursuant to step 260, then controller 38 initiates a second or subsequent stage deployment of the occupant protection devices 28, 29. Again, this is preferably done according to predetermined deployment protocol, taking into account, for example, desired delay periods between sequential deployment stages, and/or other factors.

Figure 4:
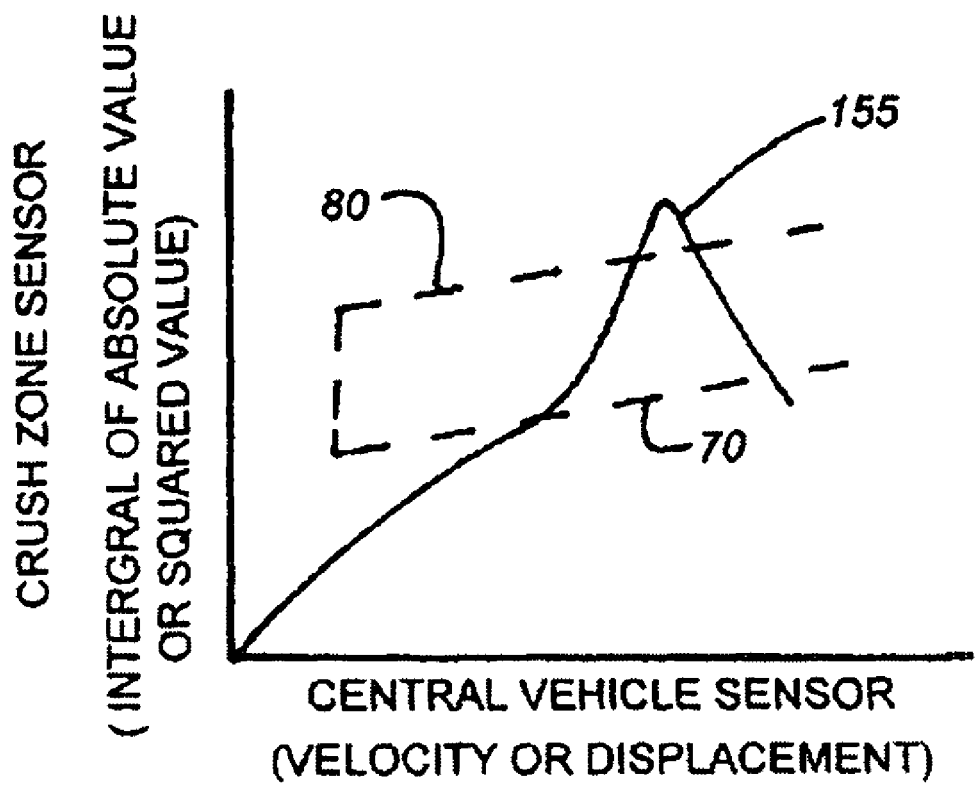
FIG. 4 is a graphical representation of crush zone sensor related values as a function of central vehicle sensor related values.

Graphical representations of uses of the rapid deployment responding occupant protection methods 40 and 40' of FIGS. 2 and 3 can be seen in FIG. 4. Namely, FIG. 4 shows an exemplary crash events and corresponding deployment initiation(s) when utilizing conserved energy crash metric values 155. Referring in general terms to the graph of FIG. 4, it shows a plot of (i) crush zone sensor related values, e.g., integrals of absolute values or squared values of acceleration signals produced by crush zone sensors 30, 31, versus (ii) central vehicle sensor related values, e.g., velocity or displacement values that result from integrating (once or multiple times) acceleration signals produced by central vehicle sensors 34, 36 depending on the particular underlying or primary crash algorithm that is implemented.

Still referring to the general graph configuration, a low threshold value 70 corresponds, for example, to values that differentiate between non-deployment stimulus or events and deployment worthy stimulus or events. Y-values of the conserved energy crash metric 155 which are less than or below the corresponding low threshold value 70 define non-deployment events. Conversely, y-values of the conserved energy crash metric 155 which exceed the low threshold value 70 define deployment events, indicating that a crash is occurring with sufficient force to justify deploying the occupant protection device(s) 28, 29.

A relatively higher threshold value 80 corresponds to, for example, predetermined magnitudes that justify initiation of multiple deployment stages. Therefore, the higher threshold value 80 line is representative of a mid-level or high level deployment threshold, depending on the underlying algorithm and configuration of occupant protection system 26. As with low threshold value 70, the line representation of the relatively higher threshold value 80 delineates the boundary between deployment worthy events, in this case a subsequent stage of deployment, and non-deployment events. Accordingly, if the Y-value(s) of the conserved energy crash metric 155 are greater than the corresponding relatively higher threshold value 80, then initiation of a subsequent stage of deployment will not occur. Conversely, if y-values of the conserved energy crash metric 155 are greater than the corresponding relatively higher threshold value 80, then one or more subsequent deployment stages of occupant protection device(s) 28, 29 are initiated.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:

1. A method of operating a motor vehicle having a deployable occupant protection device comprising:
   (a) producing a forward crash signal and a central crash signal in response to a frontal crash stimulus, wherein the forward crash signal varies between positive and negative values over time during the frontal crash stimulus;
   (b) processing the central crash signal with a crash determining algorithm, defining a primary crash metric value;
   (c) converting the negative values of the forward crash signal to positive values, defining a conditioned crash signal;
   (d) processing the conditioned crash signal with a crash determining algorithm, defining a conserved energy metric value; and
   (e) making a deployment decision for the deployable occupant protection device based on the primary and conserved energy metric values.

2. The method of claim 1 wherein the central crash signal and the conditioned crash signal are processed with the same crash determining algorithm.

3. The method of claim 1 wherein a first sensor senses the front crash stimulus at a vehicle crush zone in a front portion of the vehicle and correspondingly produces the forward crash signal, and a second sensor senses the front crash stimulus at a central vehicle location of the vehicle and correspondingly produces the central crash signal.

4. The method of claim 3 wherein the conserved energy crash metric value is a confirmatory factor influencing whether to deploy the deployable occupant protection device.

5. The method of claim 3 wherein the deployable occupant protection device deploys in multiple stages, a first deployment stage resulting from the primary crash metric value exceeding a threshold value and a second deployment stage resulting from the conserved energy metric value exceeding a threshold value.

6. The method of claim 5 wherein the first sensor senses crash acceleration at the front crush zone of the vehicle.

7. The method of claim 5 wherein the second sensor senses crash acceleration at the central vehicle location.

8. The method of claim 5 wherein the conditioned crash signal is defined by converting the negative values of the crash signal to positive values by processing with an absolute value function.

9. The method of claim 5 wherein the conditioned crash signal is defined by converting the negative values of the crash signal to positive values by processing with an exponential function having an exponent that is a positive, even, integer.

10. The method of claim 9 wherein the conditioned crash signal is defined by converting the negative values of the crash signal to positive values by using a value squaring function.

11. The method of claim 5 wherein an accumulated acceleration value is determined and the deployment decision is based at least in part by the accumulated acceleration value.

12. The method of claim 5 wherein an accumulated velocity value is determined and the deployment decision is based at least in part by the accumulated velocity value.

13. The method of claim 11 wherein the accumulated acceleration value is a confirmatory factor for determining whether to deploy the deployable occupant protection device.

14. The method of claim 12 wherein the accumulated velocity value is a confirmatory factor for determining whether to deploy the deployable occupant protection device.

15. The method of claim 1 further comprising:

initiating a first stage of occupant protection device deployment based on the primary crash metric value; and initiating a second stage of occupant protection device deployment based on the conserved energy crash metric value.

16. A motor vehicle comprising:

(a) a first sensor which provides a forward crash signal in response to a crash stimulus;

(b) a second sensor which provides a central crash signal in response to a crash stimulus;

(c) a deployable occupant protection device; and (d) an occupant protection system controller that processes the forward and central crash signals with a crash determining algorithm that evaluates whether a crash has occurred, wherein the forward crash signal varies between positive and negative values over time and at least some of the negative values are converted to positive values, defining a conditioned crash signal, for processing by the occupant protection system controller.

17. The motor vehicle of claim 16 wherein (i) the first sensor detects crash stimulus at a crush zone of the vehicle; and (ii) the second sensor detects crash stimulus at a central location in the motor vehicle.

18. The motor vehicle of claim 17 wherein the central crash signal and the conditioned crash signal are processed using the same crash determining algorithm.

19. The motor vehicle of claim 17 wherein negative values of the crash signal are converted to positive values by processing with an absolute value function, defining a conserved energy crash metric value.

20. The motor vehicle of claim 17 wherein negative values of the crash signal are converted to positive values by processing with a squaring function, defining a conserved energy crash metric value.

21. A method of operating a motor vehicle having a deployable occupant protection device comprising:

defining a primary crash metric value by:

sensing crash stimulus at a central portion of a motor vehicle during a crash event and producing a central crash signal; and processing the central crash signal with a crash determining algorithm;

defining a conserved energy metric value by:

sensing crash stimulus at a forward portion of the motor vehicle during the crash event and producing a forward crash signal that varies between positive and negative values during the crash event with the first sensor, the forward crash signal varying between positive and negative values during the crash event; and defining a conditioned crash signal by converting negative values of the forward crash signal to positive values using at least one of an absolute value function and a squaring function; and processing the conditioned crash signal with the crash determining algorithm; and making a deployment decision for deploying a deployable occupant protection device based on the primary and conserved energy metric values.

22. The method of claim 21 further comprising filtering the forward crash signal before converting the at least some of the negative values to positive values.

\* \* \* \* \*